(12) United States Patent
Abe et al.

(10) Patent No.: US 7,294,592 B2
(45) Date of Patent: Nov. 13, 2007

(54) PHOTOCATALYST-CARRYING TENT CLOTH CANVAS AND PRODUCTION METHOD THEREFOR

(75) Inventors: Shinji Abe, Chiba (JP); Hiroshi Suzuki, Saitama (JP); Nobutaka Aimono, Saitama (JP)

(73) Assignee: Nippon Soda Co., Ltd., Tokyo (JP)

( * ) Notice: Subject to any disclaimer, the term of this patent is extended or adjusted under 35 U.S.C. 154(b) by 59 days.

(21) Appl. No.: 10/203,339

(22) PCT Filed: Feb. 8, 2001

(86) PCT No.: PCT/JP01/00884

§ 371 (c)(1),
(2), (4) Date: Aug. 7, 2002

(87) PCT Pub. No.: WO01/59199

PCT Pub. Date: Aug. 16, 2001

(65) Prior Publication Data

US 2003/0087565 A1    May 8, 2003

(30) Foreign Application Priority Data

Feb. 8, 2000 (JP) ............................ 2000-035675

(51) Int. Cl.
*B32B 5/02* (2006.01)
*B32B 17/06* (2006.01)
(52) U.S. Cl. .................................. 442/131; 428/424.6
(58) Field of Classification Search .................. 442/93, 442/99, 124, 125, 131; 428/484.1, 424.6
See application file for complete search history.

(56) References Cited

U.S. PATENT DOCUMENTS 3,632,422 A * 1/1972 Maggiolo et al. ............ 442/93
4,045,600 A * 8/1977 Williams ..................... 428/216
4,888,101 A 12/1989 Cooper
6,013,372 A 1/2000 Hayakawa et al.
6,649,213 B2 * 11/2003 Debikey et al. ............. 427/161

FOREIGN PATENT DOCUMENTS

| EP | 09 633 064 A1 | 1/1995 |
|---|---|---|
| JP | 5-309267 A | 11/1993 |
| JP | 62-066861 A | 7/1994 |
| JP | 10-237769 A | 9/1998 |
| JP | 11-323726 A | 11/1999 |
| JP | 2000-303352 | 10/2000 |
| JP | 2001-98464 | 4/2001 |

OTHER PUBLICATIONS

PCT International Preliminary Examination Report for PCT/JP01/00884.
PCT Notification Of Transmittal Of Copies Of Translation Of The International Preliminary Examination Report for PCT/JP01/00884.

* cited by examiner

*Primary Examiner*—Lynda Salvatore
(74) *Attorney, Agent, or Firm*—Lahive & Cockfield, LLP; Anthony A. Laurentano; Cynthia M. Soroos

(57) ABSTRACT

A tent cloth canvas coated on the surface thereof with a photocatalyst, wherein (1) the adhesiveness between a photocatalyst and the tent cloth canvas is kept satisfactorily for an extended time, (2) an anti-fouling capability is kept for a long time, and (3) the photocatalyst carried on the tent cloth canvas does not promote a lowering with time of a tear strength. A tent cloth canvas coated on the surface thereof with a photocatalyst is used, wherein more than 50% in amount of a plasticizer contained in the canvas remains in comparison with that at an initial stage 1500 hours after the canvas is subjected to a sunshine carbon arc type accelerated weathering test as specified in JIS-K5400, or after 3-year outdoor exposure; and a tent clothe canvas having the above properties and structures further contains a plasticizer having a molecular weight of at least 400, and/or a plasticizer migration restricting layer is provided in the middle of the tent cloth and photocatalyst coating layer.

10 Claims, No Drawings

PHOTOCATALYST-CARRYING TENT CLOTH CANVAS AND PRODUCTION METHOD THEREFOR

TECHNICAL FIELDS

The present invention relates to a photocatalyst-carrying tent cloth canvas with effects such as anti-fouling, antimicrobial and fungus resistant as well as with improved weather resistance over a long period of time, and to a production method therefor.

BACKGROUND ART

Titanium oxide of n-type semiconductor is known as a photocatalyst to promote various chemical reactions, such as pasteurization and decomposition of organic substances, with UV light energy. A variety of methods for carrying a photocatalyst on such a material as glass, metal, plastic or tile have been proposed (Japanese Patent Laid-open No. Sho 62-66861, Japanese Patent Laid-open No. Hei 5-309267, EP 633064 and U.S. Pat. No. 4,888,101). Methods have been proposed for carrying a photocatalyst on a tent cloth canvas, particularly on a canvas of tent cloth kind B or C in general use, with good adhesiveness without lowering the catalyst activity and maintaining the anti-fouling, antimicrobial and fungus resistant capabilities over a long time by utilizing the photocatalyst actions effectively (Japanese Patent Laid-open No. Hei 10-237769).

DISCLOSURE OF THE INVENTION

Tent cloth canvases and tent cloth structures for the purposes of installing outdoors, particularly canvases and structures of tent cloth kinds B and C containing vinyl chloride as a main component have had a very bad drawback of damaged appearance because they usually become dirty in a few months as a large amount of plasticizer component contained in the vinyl chloride resin moves onto the surface, stays there and well attracts dust, dirt and smoke in the air. It has become possible to make a tent cloth canvas more resistant against dirt in a way that a photocatalyst carried on the surface of the canvas decomposes the plasticizer component staying on the surface of the canvas so as to prevent dust, dirt and smoke in the air from attaching.

Plasticizers usually used in the art, such as di-2-ethylhexyl phthalate, diisooctyl phthalate, di-n-octyl phthalate, di-2-ethylhexyl isophthalate, di-2-ethylhexyl terephthalate, butylbenzyl phthalate, di-n-butyl phthalate and diisoheptyl phthalate, easily migrate onto the surface of the vinyl chloride resin layer. The plasticizer staying on the surface is decomposed by the photocatalyst actions. As a result, a concentration gradient of the plasticizer occurs from the inside to the surface of the tent cloth canvas so that the migration of the plasticizer from the inside is accelerated. Therefore, a tent cloth canvas carrying a photocatalyst on the surface has disadvantages, in comparison to that carrying no photocatalyst, that the canvas is more easily hardened and the tear strength is more apt to lower.

It is an object of the present invention to provide a tent cloth canvas coated on the surface thereof with a photocatalyst, wherein (1) the adhesiveness between the photocatalyst and the tent cloth canvas is kept satisfactorily for an extended time, (2) an anti-fouling capability is kept for a long time, and (3) the photocatalyst carried on the tent cloth canvas does not promote a lowering with time of a tear strength.

The investors have studied in earnest to solve the above problems and found, as a result, that an amount of plasticizer contained in a tent cloth canvas could be maintained by use of a tent cloth canvas keeping an amount of the plasticizer contained therein, and further by either selection of a plasticizer with a large molecular weight or setting of a plasticizer migration restricting layer between the tent cloth canvas and photocatalyst coating, or both of the methods. Thus the present invention has been completed.

The present invention relates to (Composition 1) a tent cloth canvas coated on the surface thereof with a photocatalyst, wherein more than 50% in amount of a plasticizer contained in the canvas remains, in comparison with that at an initial stage, 1500 hours after the canvas is subjected to a sunshine carbon arc type accelerated weathering test as specified in JIS-K5400;

(Composition 2) a tent cloth canvas coated on the surface thereof with a photocatalyst, wherein more than 50% in amount of a plasticizer contained in the canvas remains, in comparison with that at an initial stage, after the canvas is exposed outdoors for 3 years;

(Composition 3) a tent canvas carrying a photocatalyst layer according to (Composition 1) or (Composition 2), wherein the plasticizer contained in the tent cloth canvas has a molecular weight of 400 or more;

(Composition 4) a tent cloth canvas carrying a photocatalyst layer according to one of (Composition 1) to (Composition 3), wherein a plasticizer migration restricting layer is provided in the middle of the tent cloth and photocatalyst coating layer of the tent cloth canvas coated on the surface thereof with a photocatalyst;

(Composition 5) a photocatalyst-carrying tent cloth canvas according to (Composition 4), wherein the plasticizer migration restricting layer is 0.5 to 5 μm thick;

(Composition 6) a photocatalyst-carrying tent cloth canvas according to one of (Composition 1) to (Composition 5), wherein the photocatalyst coating has a structure consisting of a photocatalyst layer and an adhesive layer provided under it; the adhesive layer is a silicone modified resin containing 2 to 60% by weight of silicone at a conversion to oxide, a resin containing 3 to 60% by weight of polysiloxane at a conversion to oxide, or a resin containing 5 to 40% by weight of colloidal silica at a conversion to oxide; and the photocatalyst layer is a photocatalyst particle complex containing 25 to 95% by weight of a metal oxide gel and/or metal hydroxide gel at a conversion to oxide;

(Composition 7) a method for producing a photocatalyst-carrying tent cloth canvas according to one of (Composition 1) to (Composition 6), wherein the plasticizer migration restricting layer and adhesive layer are continuously laminated on the tent cloth canvas in the process of producing the photocatalyst-carrying tent cloth canvas by laminating a plasticizer migration restricting layer, adhesive layer and photocatalyst layer one by one on the canvas; and (Composition 8) a method for producing a photocatalyst-carrying tent cloth canvas according to (Composition 7), wherein the boiling point of a solvent of a coating solution used to produce the plasticizer migration restricting layer is below the temperature in the process of drying the adhesive layer.

The tent cloth canvas of the present invention, coated on the surface thereof with a photocatalyst, is characterized in that more than 50% in amount of a plasticizer contained in the canvas remains, in comparison with that at an initial stage, 1500 hours after the canvas is subjected to a sunshine carbon arc type accelerated weathering test as specified in JIS-K5400.

A tent cloth canvas used in the present invention has a foundation cloth made of a fiber material, a vinyl chloride type resin layer formed on at least one of the surfaces of the cloth, and others. For the fiber material, at least one or more fibers can be used, selected from natural resins such as cotton and hemp; inorganic fibers such as glass, carbon and metal fibers; regenerated fibers such as viscose rayon and Cupra; semi-synthetic fibers such as di- or tri-acetate fibers; polyamide fibers such as nylon 6 or nylon 66; polyester fibers such as polyethylene terephthalate; synthetic fibers such as aromatic polyamide fibers, acrylic fibers, polyvinyl chloride fibers and polyolefin fibers, and the like.

Fibers in the foundation cloth can be used of any shape of yarn of discontinuous fibers, filament, split yarn, tape yarn or the like. The foundation cloth can be any of a woven cloth, kitted cloth, non-woven cloth or composite cloth of these. A foundation cloth used in the present invention is preferably of a polyester fiber, a filament in shape and a plain cloth.

Concrete examples of a vinyl chloride type resin formed on at least one of the surfaces of the foundation cloth include vinyl chloride polymers, vinyl chloride-vinyl acetate copolymers, vinyl chloride-acrylic acid ester copolymers and vinyl chloride-vinylidene chloride copolymers. They can be used alone or as a mixture of two or more. These resins can be used mixing with plasticizers, stabilizers, fillers, fireproofing agents, UV absorbents and the like.

For example, a glass fiber cloth is used as a foundation cloth, a vinyl chloride resin containing a fireproofing agent is used as a vinyl chloride type resin, and the product conforms to the membrane material performance criteria provided by the Membrane Structures Association of Japan. Then, it becomes a membrane material kind B. Similarly, a polyamide fiber, polyester fiber or aromatic polyamide fiber is used as a foundation cloth, a vinyl chloride resin containing a fireproofing agent is used as a vinyl chloride type resin, and the product conforms to the membrane material performance criteria provided by the Membrane Structures Association of Japan. Then it becomes a membrane material kind C.

Tear strength is an important indicator for the durability of a tent cloth canvas having a structure such as those mentioned above. If more than 50% in amount of a plasticizer remains in the tent cloth canvas, in comparison with that at an initial stage, 1500 hours after the canvas is subjected to a sunshine carbon arc type accelerated weathering test under the same environment as that of outdoor exposure for a long time, a lowering of the tear strength is within 30%. A structure using such a tent cloth canvas is usable for a normal life.

A structure can be satisfactorily used for a usual life if the same conditions as those mentioned above are met after it is subjected to an actual outdoor exposure test for 3 years.

It has been found that a tent cloth canvas having properties such as those mentioned above could be produced by (1) providing a layer to restrict a plasticizer to migrate (plasticizer migration restricting layer) between the tent cloth canvas and photocatalyst coating layer of a tent cloth canvas coated on the surface thereof with a photocatalyst, (2) using a plasticizer having a molecular weight of 400 or more for the tent cloth canvas, as well as combining both of them.

A material for the plasticizer migration restricting layer used in the present invention is concretely exemplified by one or a mixture of two or more materials selected from acrylic resins, acrylic silicone resins, fluorine resins, polyethylene, polypropylene, polyamide, polyester, ethylene-vinyl acetate copolymers, polyurethane, silicone resins, vinyl chloride-vinyl acetate copolymers, neoprene, Hypalon, polynitrile rubber, SBR, polyisobutylene rubber, butyl rubber, polybutadiene rubber, rubber containing fluorine and silicone rubber.

A preferred acrylic resin mentioned above and used for the plasticizer migration restricting layer is a resin containing, as a main component, a polymer or copolymer whose major constituent monomer is an ester of acrylic acid or methacrylic acid with an alcohol having 1 to 4 carbons. Concrete examples of the main constituent monomers of the acrylic acid ester resins include methyl acrylate, methyl methacrylate, ethyl acrylate, ethyl methacrylate, propyl acrylate, propyl methacrylate, butyl acrylate and butyl methacrylate. Of them, methyl acrylate and methyl methacrylate are preferred. Concrete examples of comonomers to be copolymerized with these main component monomers include monomers such as esters of acrylic acid or methacrylic acid with alcohols having 1 to 12 carbons, vinyl fluoride, vinylidene fluoride, vinyl chloride, vinylidene chloride, vinyl acetate, styrene, acrylonitrile, urethane, silicone and butadiene.

There are no particular restrictions on the polymerization forms of these copolymers. Any of random copolymers, graft copolymers, block copolymers and the like can be used. For example, a polymer produced by adding vinylidene fluoride to a methyl methacrylate polymer followed by graft polymerization, and the like can be used. Acrylates containing amino groups, imino groups, ethylene imine residues or alkylene diamine residues can be used. It is possible to use these combined with epoxy resins.

There are no particular restrictions on the thickness of the plasticizer migration restricting layer. It is preferably in the range between 0.5 and 5 μm. The restriction effect hardly changes if 5 μm or thicker, even though the effect is better if the layer is thicker. If 0.5 μm or thinner, a satisfactory restricting effect is not accomplished.

Durability can be improved if a photostabilizer and/or UV absorbent or the like are mixed into a resin of the plasticizer migration restricting layer in order to control the deterioration by light. Hindered amines are preferred to use as photostabilizers. It is also possible to use other compounds. Triazole compounds and the like can be used as UV absorbents. An addition amount is preferably 0.005% by weight or more and 10% by weight or less, more preferably 0.01% by weight or more and 5% by weight or less, to the resin.

There are no particular restrictions on methods for coating a plasticizer migration restricting layer on a tent cloth canvas. A method of coating by such a way as casting, sheet forming, spraying, dip coating or spin coating, and drying is exemplified.

When there is a process of laminating multiple layers on a tent cloth canvas, it is preferable to laminate the multiple layers in one process so as to reduce the number of processes. A process for coating a photocatalyst layer is usually difficult to perform simultaneously with other processes, because sufficient catalyst activity should be maintained. As described later, for a tent cloth canvas on which a plasticizer migration restricting layer, adhesive layer and photocatalyst layer are provided, which is a favorable form of the invention, it is preferable to coat the plasticizer migration restricting layer and adhesive layer in one process. If the plasticizer migration restricting layer and adhesive layer are coated in this order in one process, the plasticizer migration restricting layer is favorably of a composition that sufficiently dries at a temperature for drying the adhesive layer. In other words, the boiling point of a solvent of a coating solution used for producing the plasticizer migration restricting layer is preferably below the temperature of the drying process of the adhesive layer. For a composition of the adhesive layer that is a favorable form of the present invention and described later, it is preferable to keep a drying temperature to 150° C. or below in order to maintain durability and transparency. Therefore, a preferable solvent for a coating solution used to produce the plasticizer migration restricting layer has a boiling point of 150° C. or below.

Processes for laminating a plasticizer migration restricting layer, adhesive layer and photocatalyst layer on a tent cloth canvas are not restricted to the aforementioned processes. For example, it is possible to coat an adhesive layer and photocatalyst layer in one process after coating a plasticizer migration restricting layer.

It is preferable to use a compound having a molecular weight of 400 or more as a material of the plasticizer in the present invention. Concrete examples include diisononyl phthalate, diisodecyl phthalate, ditridecyl phthalate, n-heptyl n-nonyl phthalate, n-nonyl n-undecyl phthalate, n-octyl n-decyl phthalate, tri(2-ethylhexyl) phosphate, di-2-ethylhexyl azelate, di-2-ethylhexyl sebacate, tributyl acetylcitrate and chlorinated paraffin. Of them, phthalates such as diisononyl phthalate are preferred. Two or more compounds selected from the group of these compounds can be combined to use as plasticizers.

A photocatalyst coating can have any structure if it has sufficient activity on decomposing organic matter and an anti-fouling capability. It is however particularly preferable that the coating is characterized by a structure described in the following: the photocatalyst coating has a structure consisting of a photocatalyst layer and an adhesive layer provided under it; the adhesive layer is a silicone modified resin containing 2 to 60% by weight of silicone at a conversion to oxide, a resin containing 3 to 60% by weight of polysiloxane at a conversion to oxide, or a resin containing 5 to 40% by weight of colloidal silica at a conversion to oxide; and the photocatalyst layer is a photocatalyst particle complex containing 25 to 95% by weight of a metal oxide gel and/or metal hydroxide gel at a conversion to oxide.

As for a material for the adhesive layer, a silicone modified resin, such as acrylic-silicone resin or epoxy-silicone resin, containing 2 to 60% by weight of silicone at a conversion to oxide, a resin containing 3 to 60% by weight of polysiloxane at a conversion to oxide, or a resin containing 5 to 40% by weight of colloidal silica at a conversion to oxide is appropriate to adhere strongly with a photocatalyst, to prevent photocatalytic activity from lowering due to a plasticizer component defusing from the tent cloth canvas, as well as to protect the tent cloth canvas from decomposing due to oxidation by the photocatalyst. A silicone modified resin, such as acrylic-silicone resin or epoxy-silicone resin, containing less than 2% by weight of silicone at a conversion to oxide, a resin containing less than 3% by weight of polysiloxane at a conversion to oxide, or a resin containing less than 5% by weight of colloidal silica at a conversion to oxide poorly adheres with the photocatalyst layer. Besides, a photocatalyst causes deterioration of the adhesive layer, and the photocatalyst layer easily peels off. If a silicone modified resin, such as acrylic-silicone resin or epoxy-silicone resin, containing more than 60% by weight of silicone at a conversion to oxide is used, the adhesive layer poorly adheres with a carrier, and the hardness of the adhesive layer becomes small so that the abrasion resistance becomes weak. If a resin containing more than 60% by weight of polysiloxane at a conversion to oxide or a resin containing more than 40% by weight of colloidal silica at a conversion to oxide is used, the adhesive layer becomes porous, or the adhesiveness between the carrier and adhesive layer becomes bad so that the photocatalyst easily peels off from the tent cloth canvas.

There are various methods for introducing silicone into resins, including ester exchange reactions, graft reactions using silicone macromers or reactive silicone monomers, hydrosilylation reactions and block copolymerizations. If an adhesive-layer resin is a silicone modified resin, such as an acrylic-silicone resin or epoxy-silicon resin, a resin produced by any of these methods can be used. As for resins into which silicone is introduced, acrylic and epoxy resins are most suitable in terms of filmability, toughness and adhesiveness with a carrier. However, any of alkyd resins, urethane resins, polyester resins and the like can be used. These resins can be dissolved in solvents or be emulsions for use. There are no problems if additives such as cross-linking agents are contained.

If an adhesive-layer resin contains polysiloxane, a photocatalyst-carrying tent cloth canvas with more improved adhesiveness and durability is produced when the polysiloxane is a hydrolysate of silicone alkoxide with alkoxy groups having 1 to 5 carbons or a product from the hydrolysate. A silicone alkoxide is expensive and the hydrolysis speed is very slow if the number of carbons of the alkoxy group is 6 or more. Therefore, it becomes difficult to harden the polysiloxane in a resin. As a result, adhesiveness and durability become poor. It is possible to use polysiloxane produced by hydrolyzing a silicone alkoxide containing chlorine partially. Use of polysiloxane containing a large amount of chlorine may results in carrier corrosion or poor adhesiveness due to impurity chlorine ions.

There are a variety of methods for introducing polysiloxane into a resin, such that a silicone alkoxide is mixed into a resin solution in a form of monomer and hydrolyzed with moisture in the air when an adhesive layer is formed, and a product of partial hydrolysis of a silicone alkoxide is mixed with a resin beforehand, and further hydrolyzed with moisture in the air when an adhesive layer is formed. Any method can be applied if polysiloxane is mixed with a resin uniformly. A small amount of an acid or base catalyst may be added in order to change a hydrolysis speed of silicone alkoxide. Polysiloxane can be introduced into any resin including acrylic resins, acrylic-silicone resins, epoxy-silicone resins, silicone modified resins, urethane resins, epoxy resins, polyester resins and alkyd resins. Silicone modified resins including acrylic-silicone resins and epoxy-silicone resins are most suitable in respect to durability.

If an adhesive layer is made of a resin containing colloidal silica, the colloidal silica is preferably 50 nm or less in particle diameter. If 50 nm or larger, the resin in the adhesive layer deteriorates easily by a photocatalyst and the adhesion between the photocatalyst and adhesive layers becomes poor. The easiest and simplest method for introducing the colloidal silica into a resin is to mix a resin solution and a colloidal silica solution and then to coat and dry to form a protective film. A product synthesized by polymerization of a resin with colloidal silica dispersed may be used. In order to improve adhesiveness and dispersibility between colloidal silica and the resin, colloidal silica may be treated with a silane coupling agent. Colloidal silica can be introduced into any resin including acrylic resins, acrylic-silicone resins, epoxy-silicone resins, silicone modified resins, urethane resins, epoxy resins, polyester resins and alkyd resins. Silicone modified resins including acrylic-silicone resins and epoxy-silicone resins are most suitable in respect to durability. Any colloidal silica can be used, such as a silica sol produced by a cation exchange of a sodium silicate solution or a silica sol produced by hydrolysis of a silicone alkoxide.

A photostabilizer and/or UV absorbent or the like may be mixed with an adhesive-layer resin for the purpose of controlling deterioration by photocatalyst actions, so as to improve durability. Hindered amines are most favored as photostabilizers for use. It is also possible to use other compounds. Triazole compounds and the like can be used as UV absorbents. An addition amount is 0.005% by weight or more and 10% by weight or less, preferably 0.01% by weight or more and 5% by weight or less, to the resin. Treatment of the surface of an adhesive layer with a silane or titanium type coupling agent may improve the adhesiveness with a photocatalyst layer. An addition of 0.00001% by weight to 0.1% by weight of a surface-active agent to a solution for an adhesive layer can also produce a good photocatalyst carrier.

An adhesive layer can be coated and dried on a tent cloth canvas by any method including casting, sheet forming, spraying, dip coating or spin coating. Drying temperature differs depending on a coating method, solvents and type of resin used for a tent cloth canvas. It is generally preferable to be 150° C. or below. An adhesive layer is favorably 0.5 µm or thicker.

A metal oxide gel and/or metal hydroxide gel in the photocatalyst layer fixes photocatalyst powder and sticks the photocatalyst layer with the adhesive layer strongly, and has effects to improve photocatalyst activity thanks to the fact that the gel is porous so as to be adsorptive. A content of the metal oxide gel and/or metal hydroxide gel in the photocatalyst layer is preferably 25 to 95% by weight at a conversion to oxide. If less than 25% by weight, adhesion with the adhesive layer is unsatisfactory. If more than 95% by weight, photocatalyst activity is insufficient. The metal oxide gel or metal hydroxide gel is preferably 100 m/g or more in specific surface. In this case, adhesion becomes stronger and photocatalyst activity is improved.

The metal oxide or metal hydroxide gel is preferably an oxide gel or hydroxide gel of metal of silicon, aluminum, titanium, zirconium, magnesium, niobium, tantalum or tungsten. A mixture of these gels and a complex oxide gel produced by such a method as coprecipitation can also be used. It is favorable to mix a gel with a photocatalyst in the form of a sol before becoming a gel or at the stage of a material before preparing a sol. Methods for preparing gels include hydrolyses, decomposition by neutralization and ion exchange of metal salts, and hydrolyses of metal alkoxides. Any method can be used if photocatalyst powder is uniformly dispersed in a gel. A gel with few impurities is preferred because a large amount of impurities present in a gel gives bad effects on the adhesiveness and activity of the photocatalyst. Particularly if organic matter is present 5% or more in a gel, the photocatalyst activity may be reduced. When a photocatalyst layer containing an oxide sol of zirconium or aluminum is used in particular, a product obtained passes a tape test after it is subjected to a boiling water resistance test in tap water for 15 minutes or after a 24-hour immersion test in a 5% aqueous solution of sodium carbonate. Therefore, the said sol is particularly preferred for use.

For a photocatalyst in a photocatalyst layer, all of the known photocatalysts can be used including $TiO_2$, $ZnO$, $SrTiO_3$, $CdS$, $GaP$, $InP$, $GaAs$, $BaTiO_3$, $K_2NbO_3$, $Fe_2O_3$, $Ta_2O_5$, $WO_3$, $SnO_2$, $Bi_2O_3$, $NiO$, $Cu_2O$, $SiC$, $SiO_2$, $MoS_2$, $InPb$, $RuO_2$ and $CeO_2$, and those produced by adding metal and metal oxides, such as Pt, Rh, $RuO_2$, Nb, Cu, Sn or NiO, to these photocatalysts. The more a photocatalyst is contained in amount in a photocatalyst layer, the higher the photocatalyst activity. From the viewpoint of adhesiveness, it is preferable to be 75% by weight or less at a conversion to oxide. To further improve antimicrobial and fungus resistant capabilities, it is favorably adopted that 0.05 to 5% by weight, to a titanium-oxide photocatalyst, of metal or metal compound of silver or copper is added to the photocatalyst layer. If an addition amount is less than 0.05% by weight, fungus resistant capability is poorly improved. If more than 5% by weight, the photocatalyst layer may change its color so that it is difficult to apply in some cases depending on colors or patterns of a tent cloth canvas.

To form a photocatalyst layer on an adhesive layer, a suspension of a photocatalyst dispersed in a solution of metal oxide sol and/or metal hydroxide sol can be coated by the same method as that applied for forming an adhesive layer. It is possible to use in a way that a photocatalyst is dispersed in a solution of precursors of a metal oxide sol and/or metal hydroxide sol and the precursors are solated or gelled by hydrolysis or neutralization decomposition when coating. When a sol is used, an acid or alkaline defloculating agent or the like can be also added for stabilization. Adhesiveness and operationability can be improved if 5% by weight or less, to the photocatalyst, of a surface-active agent, silane coupling agent or the like is added to the sol suspension. Drying temperature when a photocatalyst layer is formed depends on a coating method, materials of a tent cloth canvas and resin materials in an adhesive layer. It is however generally preferable to be 150° C. or below.

A photocatalyst layer is preferably in the range between 0.5 and 5 µm in thickness. The activity hardly changes if 5 µm or thicker, even though the activity is higher if the layer is thicker. Problems including a lowering of translucency or film adhesiveness may occur. If the layer is 0.1 µm or thinner, translucency is improved. The photocatalyst is not however expected to have high activity because ultraviolet rays, which a photocatalyst utilizes, also pass through. When a photocatalyst layer is 0.1 µm or thicker and 5 µm or thinner, and photocatalyst particles of 40 nm or smaller in crystal particle diameter and a metal oxide gel or metal hydroxide gel with specific surface of 100 $m^2$/g or more are used, the photocatalyst has high activity and the texture of the base tent cloth canvas is not damaged and so in favored of appearance.

If a tent cloth canvas is prepared in a way that a plasticizer is selected from those mentioned above, or a plasticizer migration restricting layer is provided between a tent cloth canvas and photocatalyst coating, or both of them are carried out, and an adhesive layer and photocatalyst layer are coated on the canvas, more than 50% in amount of a plasticizer contained in the canvas remains, in comparison with that at an initial stage, 1500 hours after the canvas is subjected to a sunshine carbon arc type accelerated weathering test as specified in JIS-K5400, a lowering of the tear strength is within 30% in comparison with that at an initial stage, and the canvas is highly durable such that evaluation points are always 6 points or more in adhesiveness tested according to a crossing-cut tape method as specified in JIS-K5400.

The tent cloth canvases of the present invention are favorably applicable as canvases of tent cloth kind B or C, which are widely used.

The photocatalyst-carrying tent cloth canvases described in the present invention can be widely used as general-purpose building materials. Concrete examples include tents, tent sheet warehouses, roofs of tent warehouses, covers for transport vehicle equipment such as truck sheets, sheets for field piles, decorative tents for stores, awnings for stores and the like, roofs of various arcades, roofs and side covers of exhibition pavilions and the like, roofs and side covers of gas stations, water-proof protective sheets, snow protective sheets, air domes, pool covers, oil fences, sheet shutters, flexible containers, building curing sheets and radar domes. The canvases are preferably used particularly in places requiring anti-fouling, antimicrobial and fungus resistant effects, in order to maintain a good, beautiful condition of the surface for an extended period thanks to excellent anti-fouling, antimicrobial and fungus resistant capabilities.

Best Forms to Implement the Invention:

The present invention is described in detail in reference to Examples. The scope of the present invention is not however restricted by the examples.

EXAMPLE 1

(1) Production of a Tent Cloth Canvas

A plain cloth of polyester filament with the following structure was used as a foundation cloth.

$$\frac{1000d \times 1000d}{25 \times 25}.$$

Basis weight: 215 g/m$^2$

This foundation cloth was immersed in a solvent-diluted solution of the resin composition of Blend 1 described below containing a paste vinyl chloride resin, to impregnate the resin solution into the foundation cloth. The cloth was wrung, dried at 150° C. for a minute and then treated with heat at 185° C. for a minute so that 145 g/m$^2$ of the resin was attached in the foundation cloth for forming an undercoat layer.

Then, a film (0.16 mm thick) consisting of the resin composition of Blend 2 described below containing n-heptyl-n-undecyl phthlate as a plasticizer was prepared by a calendar method, and attached on both sides of the said foundation cloth impregnated with the undercoat layer in order to form a vinyl chloride resin of 200 g/m$^2$ on one side. As a result, a tent cloth canvas of 760 g/m$^2$ in total weight was produced.

| <Blend 1> | |
|---|---|
| Paste vinyl chloride resin | 100 parts by weight |
| n-Heptyl n-undecyl phthalate | 70 parts by weight |
| Epoxidized soy bean oil | 4 parts by weight |
| Calcium carbonate | 10 parts by weight |
| Ba—Zn type stabilizer | 2 parts by weight |
| Pigment (TiO$_2$) | 5 parts by weight |
| Toluene (solvent) | 20 parts by weight |
| <Blend 2> | |
| Straight vinyl chloride resin | 100 parts by weight |
| n-Heptyl n-undecyl phthalate | 70 parts by weight |

| -continued | |
|---|---|
| Epoxidized soy bean oil | 4 parts by weight |
| Calcium carbonate | 10 parts by weight |
| Ba—Zn type stabilizer | 2 parts by weight |
| Pigment (TiO$_2$) | 5 parts by weight |

(2) Formation of a Photocatalyst Coating Layer

BISTRATOR L, NRC-300A (produced by Nippon Soda Co., Ltd.) was coated as an adhesive layer on the vinyl chloride type resin of the said tent cloth canvas by a gravure coater, dried at 100° C. for a minute and cooled to form an adhesive layer of about 2 μm thick. On the layer was further coated BISTRATOR L, NRC-300C (produced by Nippon Soda Co., Ltd.) as a photocatalyst layer by a gravure coater, dried at 100° C. for a minute and cooled to form a photocatalyst layer of about 1 μm thick to give a photocatalyst-carrying tent cloth canvas.

COMPARATIVE EXAMPLE 1

Example 1 was repeated to prepare a photocatalyst-carrying tent cloth canvas except that di-2-ethylhexyl phthalate was used instead of n-heptyl n-undecyl phthalate, a plasticizer in Blend 2.

EXAMPLE 2

Example 1 was repeated to prepare a photocatalyst-carrying tent cloth canvas except that a solvent-diluted solution of the resin composition of Blend 3 was coated as a photocatalyst coating layer on a vinyl chloride type resin layer by a gravure coater, dried at 100° C. for a minute and cooled to provide a plasticizer migration restricting layer of about 2 μm thick, and subsequently a coating solution for an adhesive layer was coated and dried.

| <Blend 3> | |
|---|---|
| ACRYPLENE pellet HBS001 (produced by Mitsubishi Rayon Co., Ltd.) | 20 parts by weight |
| Toluene-methyl ethyl ketone (ratio by weight: 50/50) (solvent) | 80 parts by weight |

EXAMPLE 3

Example 1 was repeated to prepare a photocatalyst-carrying tent cloth canvas except that di-2-ethylhexyl phthalate was used instead of n-heptyl n-undecyl phthalate, a plasticizer in Blend 2 in Example 2.

(Evaluation Methods)

Outdoor Exposure Test

Each sample was placed facing to the south at an angle of 30 degrees and exposed outdoors continuously for the evaluations of anti-fouling capability, remaining rate of the plasticizer and tear strength of the samples.

(i) Anti-Fouling Capability

A color difference ΔE of the surface of each sample after 3-year outdoor exposure was measured in comparison with that of the original sample. The samples were evaluated according to the 3 grades described below:

ΔE =   ~ 5 :   ○ :   No dirt is found.

~ 15 :  △ :   A little dirt is found.

15 ~ :  X :   Noticeable dirt is found.

(ii) Remaining Rate of Plasticizer

A sample of 100 cm² was immersed in 300 ml of hexane at 40° C. for 24 hours to extract the plasticizer, and dried by gear oven at 60° C. for 10 minutes. An amount decreased from the initial weight was regarded as a remaining amount of the plasticizer. The remaining amounts of the plasticizer before and after the exposure were compared according to the following equation for calculating the remaining rate of the plasticizer.

Remaining rate of plasticizer (%)=(Remaining amount of plasticizer after exposure)/(remaining amount of plasticizer before exposure)×100

(iii) Tear Strength

Tear strength was measured according to a trapezoid method as specified in Japan Industrial Standards JIS-L1096.

Accelerated Weathering Test

A remaining rate of the plasticizer and tear strength were evaluated 1500 hours after a sample was subjected to a sunshine carbon arc type accelerated weathering test as specified in Japan Industrial Standards JIS-K5400.

The results of evaluating samples prepared in Examples 1 to 3 and Comparative Example 1 are together shown in Table 1.

TABLE 1

| Resin composition and evaluation item | | Example 1 | Example 2 | Example 3 | Comparative Example 1 |
|---|---|---|---|---|---|
| Vinyl chloride type resin composition | Straight vinyl chloride resin | 100 | 100 | 100 | 100 |
| | n-Heptyl n-undecyl phthalate | 70 | 70 | | |
| | Di-2-ethylhexyl phthalate | | | 70 | 70 |
| | Epoxidized soy bean oil | 4 | 4 | 4 | 4 |
| | Calcium carbonate | 10 | 10 | 10 | 10 |
| | Ba—Zn type stabilizer | 2 | 2 | 2 | 2 |
| | Pigment (TiO₂) | 5 | 5 | 5 | 5 |
| Plasticizer migration restricting layer | | Without | With | With | Without |
| Outdoor exposure | Anti-fouling (ΔE) | ○ (4) | ○ (2) | ○ (2) | △ (10) |
| | Plasticizer remaining rate (%) | 55 | 65 | 59 | 38 |
| | Tear strength (kgf) | 17 × 15 | 18 × 18 | 16 × 17 | 8 × 9 |
| | (Tear strength lowering rate) | (19 × 29) | (14 × 14) | (24 × 19) | (62 × 57) |
| Accelerated weathering | Plasticizer remaining rate (%) | 53 | 66 | 61 | 40 |
| | Tear strength (kgf) | 15 × 16 | 18 × 17 | 17 × 18 | 8 × 7 |
| | (Tear strength lowering rate) | (29 × 24) | (14 × 19) | (19 × 14) | (62 × 67) |

In Table 1, the figures in bracket in the anti-fouling column represent ΔE values.

The tear strength values are represented in a form of (vertical tear strength)×(horizontal tear strength).

The tear strength lowering rate in the tear strength column is a value calculated from [{value of initial tear strength, 21×21 (kgf)}−(value after outdoor exposure or accelerated weathering test)]/(initial tear strength)×100. The value is shown in a form of (vertical strength lowering rate)×(horizontal strength lowering rate).

From Table 1, it is understood that the tent cloth canvases of the present invention are better than that of Comparative Example 1 in respect to both anti-fouling capability and tear strength.

Applicability in Industry:

As described above, the present invention is characterized in controlling the deterioration of a tear strength with time due to the hardening of a tent cloth canvas, by means of keeping 50% or more of a plasticizer contained in a tent cloth canvas, in comparison with that at the initial stage, 1500 hours after the canvas is subjected to an accelerated weathering test or after 3-year outdoor exposure. The canvas has characteristics that organic stains attached on the surface of the photocatalyst layer are promptly decomposed by the photocatalyst actions and remaining inorganic dirt is also promptly washed away in such a occasion as raining thanks to no presence of organic stains, such as oils, which play a role as sticking agents. The present invention has effects that the anti-fouling capability can be maintained for a long period of time, a plasticizer is not lost more than necessary, and a change of tear strength with time is not accelerated.

Photocatalyst-carrying tent cloth canvases of the prior art, when used in places of high temperature and humidity, have such a problem that molds resistant to the photocatalysts grow using plasticizers and the like as nutrients. Use of the tent cloth canvases of the present invention can solve the said problem because a plasticizer migration is restricted.

The invention claimed is:

1. A tent cloth canvas, comprising:
   a photocatalyst layer;
   a tent cloth canvas layer;
   a film consisting of a vinyl chloride resin on the tent cloth canvas layer; and
   an adhesive layer disposed between the photocatalyst layer and the tent cloth canvas layer,
   wherein the tent cloth canvas layer includes plasticizer having a molecular weight of 400 or more and comprises a foundation cloth member made of a fiber material and a resin layer formed on at least one surface of the foundation cloth member by impregnating a resin solution into the foundation cloth member, wherein the plasticizer is at least one selected from the group consisting of n-heptyl-n-undecyl phthalate, diisononyl phthalate, ditridecyl phthalate, n-heptyl n-nonyl phthalate, n-nonyl n-undecyl phthalate, n-octyl n-decyl phthalate, tri(2-ethylhexyl) phosphate, di-2-ethylhexyl sebacate, tributyl acetylcitrate and chlorinated paraffin.

2. A tent cloth canvas, comprising:
a photocatalyst layer;
an adhesive layer disposed beneath the photocatalyst layer;
a tent cloth canvas layer;
a film consisting of a vinyl chloride resin on the tent cloth canvas layer; and
a plasticizer migration restricting layer disposed between the adhesive layer and the tent cloth canvas layer,
wherein the tent cloth canvas layer includes a plasticizer having a molecular weight of 400 or more and comprises a foundation cloth member made of a fiber material and a resin layer formed on at least one surface of the foundation cloth member by impregnating a resin solution into the foundation cloth member, wherein the plasticizer is at least one selected from the group consisting of n-heptyl-n-undecyl phthalate, diisononyl phthalate, ditridecyl phthalate, n-heptyl n-nonyl phthalate, n-nonyl n-undecyl phthalate, n-octyl n-decyl phthalate, tri(2-ethylhexyl) phosphate, di-2-ethylhexyl sebacate, tributyl acetylcitrate and chlorinated paraffin.

3. The tent cloth canvas according to claim 2, wherein the plasticizer migration restricting layer is 0.5 to 5 μm thick.

4. The tent cloth canvas according to claim 1 or 2, wherein the adhesive layer is a silicone modified resin containing 2 to 60% by weight of silicone converted to oxide, a resin containing 3 to 60% by weight of polysiloxane converted to oxide, or a resin containing 5 to 40% by weight of colloidal silica converted to oxide; and the photocatalyst layer is a photocatalyst particle complex containing 25 to 95% by weight of a metal oxide gel and/or metal hydroxide gel converted to oxide.

5. The tent cloth canvas according to claim 2, wherein the plasticizer migration restricting layer includes at least one material selected from acrylic resins, acrylic silicone resins, fluorine resins, polyethylene, polypropylene, polyamide, polyester, ethylene-vinyl acetate copolymers, polyurethane, silicone resins, vinyl chloride-vinyl acetate copolymers, neoprene, Hypalon, polynitrile rubber, SBR, polyisobutylene rubber, butyl rubber, polybutadiene rubber, rubber containing fluorine, and silicon rubber.

6. The tent cloth canvas according to claim 2, wherein the plasticizer migration restricting layer includes 0.5 to 5 μm thickness of at least one material selected from acrylic resins, fluorine resins, polyethylene, polypropylene, polyamide, polyester, ethylene-vinyl acetate copolymers, polyurethane, and vinyl chloride-vinyl acetate copolymers.

7. The tent cloth canvas according to any one of claims 1, 2, 3, 5, or 6, wherein more than 50% in amount of a plasticizer contained in the tent cloth canvas layer remains, in comparison with that at an initial stage, 1500 hours after the canvas is subject to a sunshine carbon arc type accelerated weathering test as specified in JIS-K5400.

8. The tent cloth canvas according to any one of claims 1, 2, 3, 5, or 6, wherein more than 50% in amount of a plasticizer contained in the tent cloth canvas layer remains, in comparison with that at an initial stage, after the canvas is exposed outdoors for 3 years.

9. The tent cloth canvas according to claim 1, wherein lowering of tear strength of the tent cloth canvas is within 30%, in comparison with that at an initial stage, 1500 hours after the canvas is subjected to a sunshine carbon arc type accelerated weathering test.

10. A method of producing a tent cloth canvas of any one of claims 1, 3, 5, 6, and 9, comprising
laminating a plasticizer migration restriction layer, an adhesive layer and a photocatalyst layer in that order on a tent cloth canvas layer, wherein
the plasticizer migration restricting layer and the adhesive layer are laminated on the tent cloth canvas layer in one process.

* * * * *

UNITED STATES PATENT AND TRADEMARK OFFICE
CERTIFICATE OF CORRECTION

PATENT NO.         : 7,294,592 B2
APPLICATION NO. : 10/203339
DATED              : November 13, 2007
INVENTOR(S)        : Shinji Abe et al.

It is certified that error appears in the above-identified patent and that said Letters Patent is hereby corrected as shown below:

On the Cover Page, at (73) Assignee, please add --Hiraoka & Co., LTD.--

Signed and Sealed this

Twentieth Day of January, 2009

JON W. DUDAS
*Director of the United States Patent and Trademark Office*